Aug. 3, 1948. L. H. LEONARD 2,446,480
AIRCRAFT LANDING GEAR
Original Filed Jan. 25, 1941
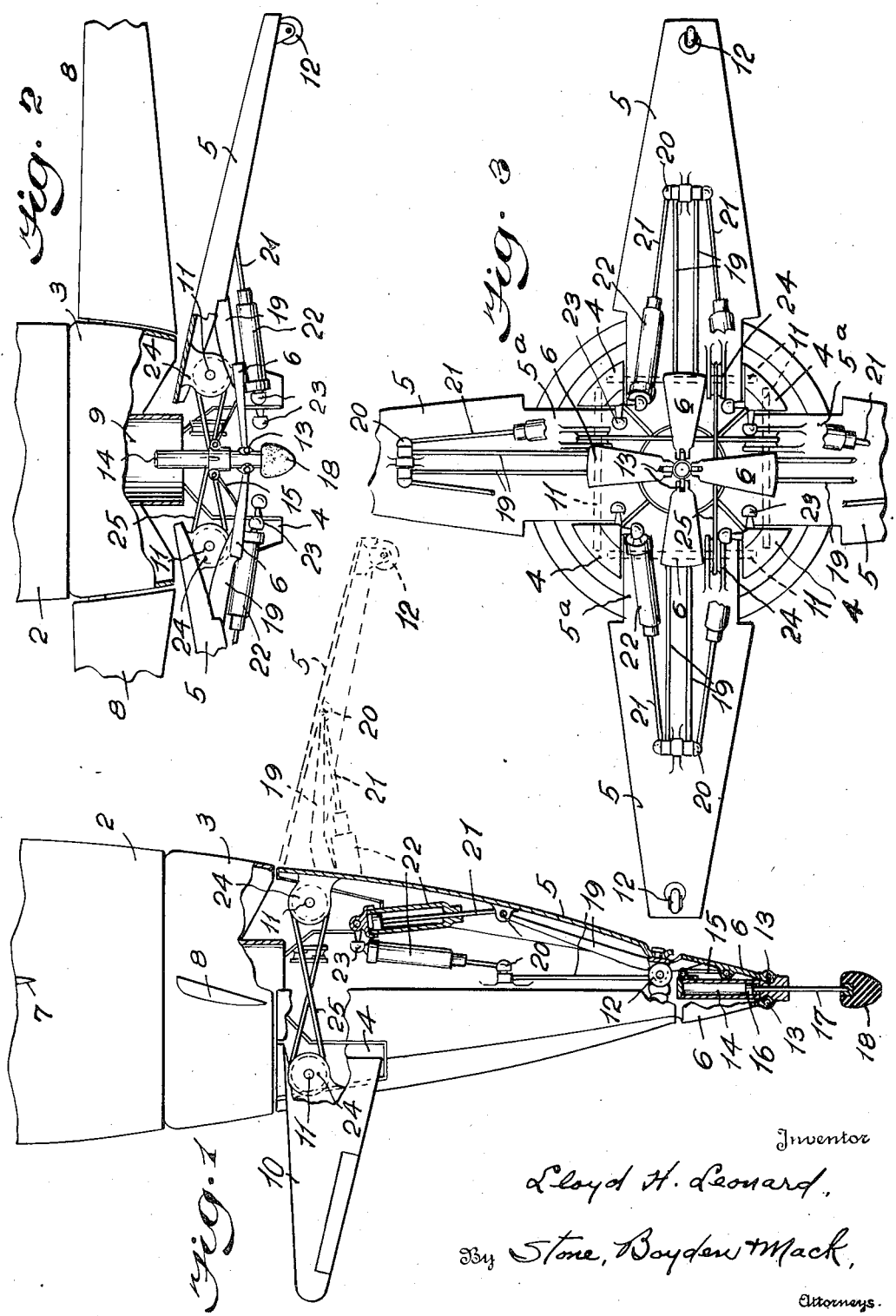
Inventor
Lloyd H. Leonard,
By Stone, Boyden & Mack,
Attorneys.

Patented Aug. 3, 1948

2,446,480

UNITED STATES PATENT OFFICE 2,446,480

AIRCRAFT LANDING GEAR

Lloyd H. Leonard, Long Island City, N. Y.

Original application January 25, 1941, Serial No. 375,991. Divided and this application June 27, 1945, Serial No. 601,859

6 Claims. (Cl. 244—102)

This invention relates to landing gear for heavier than air aircraft, and more particularly for aircraft of the axial flow helicopter type.

The present application is a division of my prior copending application S. N. 375,991, filed January 25, 1941 now Patent No. 2,387,762 of October 30, 1945.

In said prior application there is disclosed a helicopter of the axial flow type comprising an elongated fuselage having propeller means operating in a plane transverse to the axis thereof, which axis is substantially vertical during vertical flight, and substantially horizontal during horizontal flight. Thus the craft both rises and descends endwise, and hence it is necessary to provide at the end of the fuselage a structure capable both of supporting the craft in upright position, when on the ground, and of serving as landing gear, when the craft descends.

An object of the invention, therefore, is to provide an improved structure capable of performing both of these functions, and which will not produce any appreciable air resistance when the craft is in flight. To this end, my improved structure comprises tail segments normally folded so as to conform with the streamlined contour of the fuselage, when in flying position.

A further object is to provide means whereby the tail segments are automatically opened or expanded, upon contact with the ground, so as to constitute legs having a wide base capable of supporting the craft in upright position.

A still further object of the invention is to provide improved means for effectively absorbing the shock due to contact of the craft with the ground at the moment of landing.

In order that the invention may be readily understood, reference is had to the accompanying drawing, forming part of this specification, and in which:

Fig. 1 is a sectional elevational view showing the rear or tail portion of the aircraft, such portion comprising my improved landing gear, the parts being shown in full lines in the position which they occupy during flight and in dotted lines in the position which they occupy when on the ground;

Fig. 2 is a fragmentary elevational view showing the landing gear as it appears when fully expanded and resting on the ground, parts being in section, and parts being omitted for the sake of clearness; and Fig. 3 is an end or bottom view looking upward at the parts illustrated in Fig. 2, the wings being omitted.

Referring to the drawing in detail, and as set forth more fully in my said prior co-pending application, the aircraft comprises, adjacent the tail, two rotary sections 2 and 3, constituting hubs, carrying radial propeller blades 7 and 8.

The rear of the propeller 8 are a plurality of fixed portions 4, and rearwardly of these portions extend a plurality of streamlined segments 5 and 6 constituting the tail portion of the craft and also, as will hereinafter appear, constructed to form the landing gear. Four of each group of such segments are illustrated.

In this connection, it will be understood that, as stated in the preamble, my improved aircraft is designed to land endwise tail first, and to stand on the ground in upright position, all as hereinafter more fully described.

As already stated, there are a plurality of fixed portions 4 projecting back behind the rearmost rotor or propeller, and the streamlined segments 5 forming the tail portions have narrowed end portions 5a which extend between the fixed portions 4 and which are pivotally mounted on transversely extending rods 11, so that the segments 5 may swing from the normal streamlined position shown in Fig. 1 to the expanded position shown in Figs. 2 and 3.

At the ends of the segments 5 are ground wheels or rollers 12 of any suitable type, these rollers being normally housed within the tail of the craft as shown in Fig. 1.

Beyond the end of the segments 5 are a similar number of smaller segments 6, forming the tip of the tail, and these are pivotally mounted at 13 upon a cylinder 14 extending axially of the tail, and are also connected to the inner end of said cylinder by means of links 15. A piston 16 is mounted to reciprocate in the cylinder 14 and is carried by a rod 17 which extends rearwardly and is provided at its end with a rubber or other suitable bumper 18. The purpose of the piston and cylinder just described is to act as a pneumatic cushion to assist in absorbing the shock at the moment of impact of the bumper 18 with the ground.

Rigidly secured to each segment 6 and extending forwardly within the tail is an arm 19, the end of which is pivoted as at 20 to the adjacent segment 5. The segments 6 and arms 19 together constitute links connecting the cylinder 14 with the segments 5. Also pivoted at 20 is one end of a pair of piston rods 21 carrying at the other ends pistons which slide in cylinders 22 pivotally secured as at 23 to the fixed portions 4. These cylinders and pistons directly connecting the pivoted segments with the fuselage also help to cushion and retard the opening movement of the segments.

In order to insure that the segments 5 on opposite sides of the tail open simultaneously and to the same extent, a pulley 24, concentric with the pivot 11, is rigidly secured to each segment, and a band or belt 25 passes around and connects pulleys at the opposite sides of the tail as shown. Thus the segments are geared together at their upper ends.

If we assume the aircraft to be descending vertically in the position shown in Fig. 1, the bumper 18 will engage the ground and upon further movement the cylinder 14, acting through the links 19, will cause both the segments 5 and 6 to expand into the position shown in Figs. 2 and 3, thus bringing the rollers 12 into engagement with the ground at widely separated points, thus constituting a broad polygonal base on which the aircraft may be supported in upright position, as shown in Fig. 2.

From the foregoing, it will be understood that as the end of the tail of the aircraft contacts the ground, the segments 5 will be automatically expanded or opened up, retarded by the cylinders 22 so as to form legs capable of supporting the aircraft in upright position.

It will be seen that the links 15 serve to keep the cylinder 14 and rod 17 in line with the axis of the fuselage. It will be further understood that, when the craft lands, the cylinder 14 takes the initial shock, and, as the segments open up, the cylinders 22 provide additional cushioning means.

These cylinders provide shock absorbing means having a relatively long travel. It will be noted that the bumper 18 moves from the position shown in Fig. 1 to that shown in Fig. 2, as the segments expand or spread, which is a distance approximately equal to the length of the segments.

Aircraft of the type described necessarily have a fairly rapid rate of descent, and thus a shock-absorbing structure of long travel is desirable. This makes possible any desired propeller disc loading, within reasonable limits.

What I claim is:

1. An aircraft comprising an elongated fuselage constructed to rise and descend vertically endwise, and landing gear at one end of said fuselage, said landing gear comprising a plurality of longitudinally extending, laterally expansible members, normally grouped to form a streamlined continuation of the outer surface of said fuselage, and means operated by contact with the ground, when landing endwise, for automatically expanding said members to form a broad polygonal base for supporting said fuselage in upright position.

2. An aircraft comprising an elongated fuselage constructed to rise and descend vertically endwise, and landing gear at one end of said fuselage, said landing gear comprising a plurality of longitudinally extending, laterally expansible members pivoted to the fuselage at their upper ends, and normally forming a streamlined continuation of the outer surface thereof and means operated by contact with the ground when landing endwise, for automatically swinging said members outwardly on their pivots to form a broad polygonal base for supporting said fuselage.

3. An aircraft comprising an elongated fuselage constructed to rise and descend vertically endwise, and landing gear at one end of said fuselage, said landing gear comprising longitudinally extending, laterally expansible members pivoted to the fuselage at their upper ends, and means operated by contact with the ground when landing endwise, for automatically swinging said members outwardly on their pivots to form a broad base for supporting said fuselage, and pneumatic cushion means directly connecting each of said pivoted members and said fuselage.

4. An aircraft comprising an elongated fuselage constructed to rise and descend vertically endwise, and landing gear at one end of said fuselage, said landing gear comprising longitudinally extending, laterally expansible members pivoted to the fuselage at their upper ends and geared together, and linkage means operated by contact with the ground when landing endwise, for automatically swinging said members outwardly on their pivots to form a broad polygonal base for supporting said fuselage.

5. An aircraft comprising an elongated fuselage constructed to rise and descend vertically endwise, and landing gear at one end of said fuselage, said landing gear comprising longitudinally extending, laterally expansible members pivoted to the fuselage at their upper ends, and means operated by contact with the ground when landing endwise, for automatically swinging said members outwardly on their pivots to form a broad base for supporting said fuselage, said means including linkage and a ground engaging bumper movable axially of said fuselage, cushion means interposed between said bumper and linkage for absorbing the initial shock of landing, and additional cushion means interposed between each of said pivoted members and fuselage.

6. An aircraft comprising an elongated fuselage constructed to rise and descend vertically endwise, and landing gear at one end of said fuselage, said landing gear comprising a plurality of longitudinally extending, laterally expansible segments pivoted to the fuselage at their upper ends and normally assembled to constitute a streamlined hollow tail portion thereof, and means operated by contact with the ground when landing endwise, and including linkage housed within said hollow tail portion, for automatically swinging said segments outwardly on their pivots to form a broad polygonal base for supporting said fuselage in upright position.

LLOYD H. LEONARD.

REFERENCES CITED

The following references are of record in the file of this patent:

UNITED STATES PATENTS

| Number | Name | Date |
|---|---|---|
| 1,361,222 | Berliner | Dec. 7, 1920 |
| 1,686,080 | Ford | Oct. 2, 1928 |
| 1,791,597 | Langdon | Feb. 10, 1931 |
| 2,043,704 | McPherren | June 9, 1936 |

FOREIGN PATENTS

| Number | Country | Date |
|---|---|---|
| 691,150 | Germany | May 17, 1940 |